(12) United States Patent
Seo et al.

(10) Patent No.: US 11,255,065 B2
(45) Date of Patent: Feb. 22, 2022

(54) COVER BAND OF STEEL PIPE STRUT CONNECTOR, STEEL PIPE STRUT CONNECTOR HAVING SAME, AND STEEL PIPE STRUT ASSEMBLY

(71) Applicants: HENCE CONSTRUCTION CO., LTD., Seoul (KR); Gyeong Sik Seo, Seoul (KR)

(72) Inventors: Gyeong Sik Seo, Seoul (KR); Seung Kwon Seo, Seoul (KR)

(73) Assignees: Gyeong Sik Seo, Seoul (KR); HENCE CONSTRUCTION CO., LTD., Seoul (KR)

( * ) Notice: Subject to any disclaimer, the term of this patent is extended or adjusted under 35 U.S.C. 154(b) by 0 days.

(21) Appl. No.: 16/963,987

(22) PCT Filed: Mar. 4, 2019

(86) PCT No.: PCT/KR2019/002472
§ 371 (c)(1),
(2) Date: Jul. 22, 2020

(87) PCT Pub. No.: WO2019/172587
PCT Pub. Date: Sep. 12, 2019

(65) Prior Publication Data
US 2021/0032830 A1 Feb. 4, 2021

(30) Foreign Application Priority Data
Mar. 7, 2018 (KR) .................. 10-2018-0026731

(51) Int. Cl.
*E02D 17/08* (2006.01)
*E02D 17/04* (2006.01)
*F16B 7/18* (2006.01)

(52) U.S. Cl.
CPC .......... *E02D 17/083* (2013.01); *E02D 17/04* (2013.01); *F16B 7/182* (2013.01);
(Continued)

(58) Field of Classification Search
CPC .................. E02D 17/083; E02D 17/04; E02D 2200/1685; E02D 2300/0029;
(Continued)

(56) References Cited

U.S. PATENT DOCUMENTS

| | | | |
|---|---|---|---|
| 4,940,259 A * | 7/1990 | Williams | F16L 23/024 285/3 |
| 8,169,371 B1 * | 5/2012 | Chamberlain | H01Q 9/0407 343/700 MS |
| D714,629 S * | 10/2014 | Irgens | D8/394 |

FOREIGN PATENT DOCUMENTS

| | | | |
|---|---|---|---|
| KR | 20-0414056 Y1 | 4/2006 | |
| KR | 20-0416514 Y1 | 5/2006 | |

(Continued)

*Primary Examiner* — Carib A Oquendo
(74) *Attorney, Agent, or Firm* — Novick, Kim & Lee, PLLC; Jae Youn Kim; Jihun Kim

(57) ABSTRACT

A cover band has a cover band body provided with a cover band arch portion corresponding to the outer peripheral surface of a steel pipe strut and a plurality of cover band through holes formed on the cover band body in such a manner as to correspond to a plurality of strut coupling holes. The cover band through holes have shapes of long holes extended in one direction and the extended direction of at least one of the cover band through holes is made to cross the extended direction of the other cover band through hole.

6 Claims, 12 Drawing Sheets

(52) U.S. Cl.
CPC .. *E02D 2200/1685* (2013.01); *E02D 2220/00* (2013.01); *E02D 2300/0029* (2013.01); *E02D 2600/20* (2013.01)

(58) Field of Classification Search
CPC ... E02D 2600/20; E02D 2220/00; E04B 1/40; E04B 2001/5887; E04B 1/585; E04C 3/32; E04G 17/047; E04G 17/042
See application file for complete search history.

(56) References Cited

FOREIGN PATENT DOCUMENTS

| | | | | |
|---|---|---|---|---|
| KR | 20090114346 | * | 11/2009 | ........... E02D 17/083 |
| KR | 20120055236 | * | 5/2012 | ............. E02D 17/04 |
| KR | 10-0838736 B1 | | 7/2012 | |
| KR | 10-1167475 B1 | | 7/2012 | |
| KR | 2012-0120565 A | | 11/2012 | |
| KR | 10-2013-0062018 A | | 6/2013 | |
| KR | 20130121622 | * | 11/2013 | ............. E02D 5/526 |
| KR | 101708034 B1 | * | 2/2017 | ............. E02D 17/04 |
| KR | 101750701 | * | 6/2017 | ............. E02D 17/04 |
| WO | WO-2016003208 A1 | * | 1/2016 | ............. E02D 17/08 |

* cited by examiner

COVER BAND OF STEEL PIPE STRUT CONNECTOR, STEEL PIPE STRUT CONNECTOR HAVING SAME, AND STEEL PIPE STRUT ASSEMBLY

TECHNICAL FIELD

The present invention relates to a steel pipe strut connector, and more particularly, to a cover band of a steel pipe strut connector and a steel pipe strut connector and a steel pipe strut assembly having the same that are capable of connecting a steel pipe strut to a wale of an earth retaining wall used for supporting an earth pressure in underground excavation so as to provide a support force for the wale.

BACKGROUND ART

During excavation for basement construction of facilities such as a subway, building, underground roadway, underground storage facility, and so on, generally, earth retaining work for the outer edges of the excavated site is conducted to support an earth pressure.

The earth retaining work is aimed at resisting a lateral pressure like an earth pressure, a water pressure, and so on that occurs during underground excavation, but as excavation construction for downtown sections has been frequently conducted, recently, the earth retaining work is used for avoiding the settlement of surrounding ground and for the protection of buildings. Like this, the earth retaining work becomes diversified in the applicable fields thereof.

The earth retaining work is conducted during the excavation. In the earth retaining work, generally, support columns like H beams are erected vertically with respect to the ground in such a manner as to be spaced apart from each other at arbitrary intervals, and next, a plurality of earth retaining plates is laminatedly inserted into the neighboring support columns, thereby constructing an earth retaining wall for supporting an earth or rock wall. Next, wales are connected to the support columns in a transverse direction, and the facing wales are connected to each other by means of struts, thereby allowing the earth retaining wall to be resistant to the earth pressure.

The struts serve to effectively support the earth pressure applied to the earth retaining wall to prevent earth and sand of the excavated earth wall from being lost or from the earth wall from collapsing, and generally, they are located at constant intervals. A connection jack is fastened to a connection portion between the wale and the strut so that it is possible to adjust a length of the strut. In conventional practices, H beams are used as the struts. By the way, the H beams are easily buckled and have heavy weights, and accordingly, steel pipe struts have been recently increasingly used.

The steel pipe struts have circular cross sections, and so as to connect the steel pipe strut to the wale or to connect two steel pipe struts to each other, accordingly, a connector is needed for maintaining a stable coupled state with the end periphery of the steel pipe strut.

For example, a steel pipe strut connection structure for connecting the end peripheries of two steel pipe struts is disclosed in Korean Patent Laid-open No. 2012-0120565 (Dated on Nov. 2, 2012). The conventional steel pipe strut connection structure is configured to have one pair of steel pipe connection members coupled to front end peripheries of the two steel pipe struts by means of bolts and nuts and also fixed to each other by means of bolts and nuts.

In the conventional steel pipe strut connection structure, by the way, a number of bolts and nuts are needed to couple one pair of steel pipe strut connection members to each other or to fix the steel pipe strut connection members to the steel pipe struts, which causes many inconveniences in the work and extends the time for the connection work.

DISCLOSURE

Technical Problem

Accordingly, the present invention has been made in view of the above-mentioned problems occurring in the related art, and it is an object of the present invention to provide a cover band of a steel pipe strut connector and a steel pipe strut connector and a steel pipe strut assembly having the same that are capable of easily connecting a steel pipe strut to a wale of an earth retaining wall, thereby shortening time for the connection work.

Technical Solution

To accomplish the above-mentioned object, according to one aspect of the present invention, there is provided a cover band of a steel pipe strut connector, which is separably coupled to a steel pipe strut connected to an earth retaining wall in such a manner as to surround a portion of an outer peripheral surface of the steel pipe strut, the cover band including: a cover band body having a cover band arch portion corresponding to the outer peripheral surface of the steel pipe strut and a plurality of cover band through holes formed on the cover band body in such a manner as to correspond to a plurality of strut coupling holes spaced apart from each other on the outer peripheral surface of the steel pipe strut in a radial direction of the steel pipe strut, wherein the cover band through holes have shapes of long holes extended in one direction and the extended direction of at least one of the cover band through holes is made to cross the extended direction of the other cover band through hole.

According to the present invention, desirably, at least one of the cover band through holes is extended in a longitudinal direction of the steel pipe strut coupled to the cover band arch portion, and at least the other is extended in a vertical direction with respect to the longitudinal direction of the steel pipe strut coupled to the cover band arch portion.

According to the present invention, desirably, the cover band further includes a plurality of cover band thickness reinforcing portions protruding from an outer peripheral surface of the cover band body, the cover band through holes being arranged on the cover band thickness reinforcing portions.

To accomplish the above-mentioned object, according to another aspect of the present invention, there is provided a steel pipe strut connector coupled to an end periphery of a steel pipe strut connected to an earth retaining wall, the steel pipe strut connector including: a connector base having a base body and a base band, the base band comprising a base band body located on the base body and having a base band arch portion corresponding to an outer peripheral surface of the steel pipe strut and a plurality of base band through holes formed on the base band body in such a manner as to correspond to a plurality of strut coupling holes spaced apart from each other on the outer peripheral surface of the steel pipe strut in a radial direction of the steel pipe strut; a cover band having a cover band body provided with a cover band arch portion corresponding to the outer peripheral surface of the steel pipe strut and a plurality of cover band through holes formed on the cover band body in such a manner as to correspond to the plurality of strut coupling holes; cover band fixing elements adapted to fix the cover band to the connector base; and a plurality of fastening members inserted into the strut coupling holes, the base band through holes, and the cover band through holes to fasten the steel pipe strut to the connector base and the cover band, wherein the cover band through holes have shapes of long holes extended in one direction and the extended direction of at least one of the cover band through holes is made to cross the extended direction of the other cover band through hole.

According to the present invention, desirably, the base band through holes have shapes of long holes extended in one direction in such a manner as to correspond to the cover band through holes and the extended direction of at least one of the base band through holes is made to cross the extended direction of the other base band through hole.

According to the present invention, desirably, at least one of the plurality of fastening members is located to vertically cross the other fastening member to allow the steel pipe strut, the connector base, and the cover band to be fastened to one another.

According to the present invention, desirably, one pair of base bands are located to place the base body therebetween to allow two steel pipe struts to be coupled to the connector base and one pair of cover bands are coupled to the connector base in such a manner as to correspond to one pair of base bands.

To accomplish the above-mentioned object, according to yet another aspect of the present invention, there is provided a steel pipe strut assembly for connecting two wales coupled to earth retaining walls, the steel pipe strut assembly including: a steel pipe strut; a first steel pipe strut connector located between the steel pipe strut and any one of the two wales; a second steel pipe strut connector located between the steel pipe strut and the other of the two wales; and a connection jack located between any one of the two wales and the first steel pipe strut connector to pressurize the first steel pipe strut connector so that a distance between any one of the two wales and the first steel pipe strut connector is adjusted, wherein the distance between any one of the two wales and the first steel pipe strut connector is changeable by means of the connection jack, and the second steel pipe strut connector is fixedly connected to the other of the two wales, each of the first steel pipe strut connector and the second steel pipe strut connector including: a connector base having a base body and a base band, the base band comprising a base band body located on the base body and having a base band arch portion corresponding to an outer peripheral surface of the steel pipe strut and a plurality of base band through holes formed on the base band body in such a manner as to correspond to a plurality of strut coupling holes spaced apart from each other on the outer peripheral surface of the steel pipe strut in a radial direction of the steel pipe strut; a cover band having a cover band body provided with a cover band arch portion corresponding to the outer peripheral surface of the steel pipe strut and a plurality of cover band through holes formed on the cover band body in such a manner as to correspond to the plurality of strut coupling holes; cover band fixing elements adapted to fix the cover band to the connector base; and a plurality of fastening members inserted into the strut coupling holes, the base band through holes, and the cover band through holes to fasten the steel pipe strut to the connector base and the cover band, the cover band through holes having shapes of long holes extended in one direction and the extended direction of at least one of the cover band through holes being made to cross the extended direction of the other cover band through hole.

According to the present invention, desirably, the connection jack includes: a connection jack body coupled to the connector base of the first steel pipe strut connector; a connection jack bracket coupled to the connection jack body in such a manner as to be fixedly located to any one of the two wales and having a plurality of connection jack coupling holes adapted to insert fixing members for coupling any one of the two wales thereinto, the connection jack coupling holes having shapes of long holes extended in a direction crossing a pressurizing direction of the first steel pipe strut connector.

According to the present invention, desirably, a plurality of steel pipe struts are arranged serially with one another by means of a third steel pipe strut connector and the third steel pipe strut connector comprises one pair of base bands located on both sides of the connector base to allow the two steel pipe struts adjacent to each other to be connected to each other and a pair of cover bands corresponding to one pair of base bands, the base bands and the cover bands of the third steel pipe strut connector having the same structure as the base bands and the cover bands of the first steel pipe strut connector and the second steel pipe strut connector.

Advantageous Effects

According to the present invention, the steel pipe strut connector according to the present invention can be firmly coupled to the end periphery of the steel pipe strut to stably connect the steel pipe strut to the wale or another steel pipe strut.

In addition, the steel pipe strut connector according to the present invention can be easily coupled to the steel pipe strut, can be conveniently handled by the worker, and can reduce the time needed for the connection of the steel pipe strut.

Further, the cover band of the steel pipe strut connector according to the present invention can be easily connected to the steel pipe strut and reduce the time needed for the connection of the steel pipe strut.

MODE FOR INVENTION

Hereinafter, an explanation on a cover band for a steel pipe strut connector and a steel pipe strut connector and a steel pipe strut assembly having the same according to the present invention will be in detail given with reference to the attached drawings.

Figure 1:
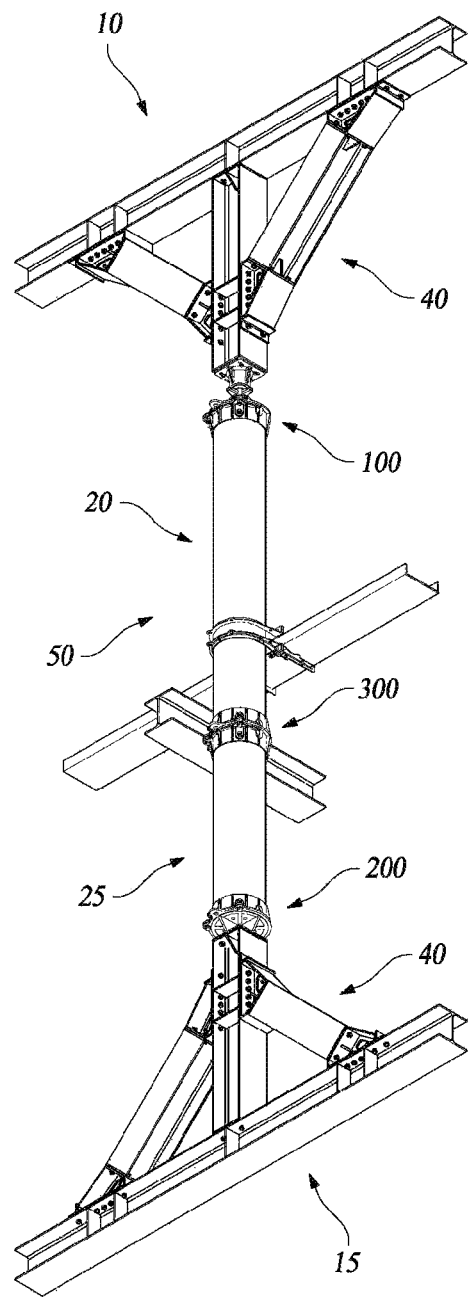
FIG. 1 is a perspective view showing an installation state of a steel pipe strut assembly according to the present invention.
Figure 2:
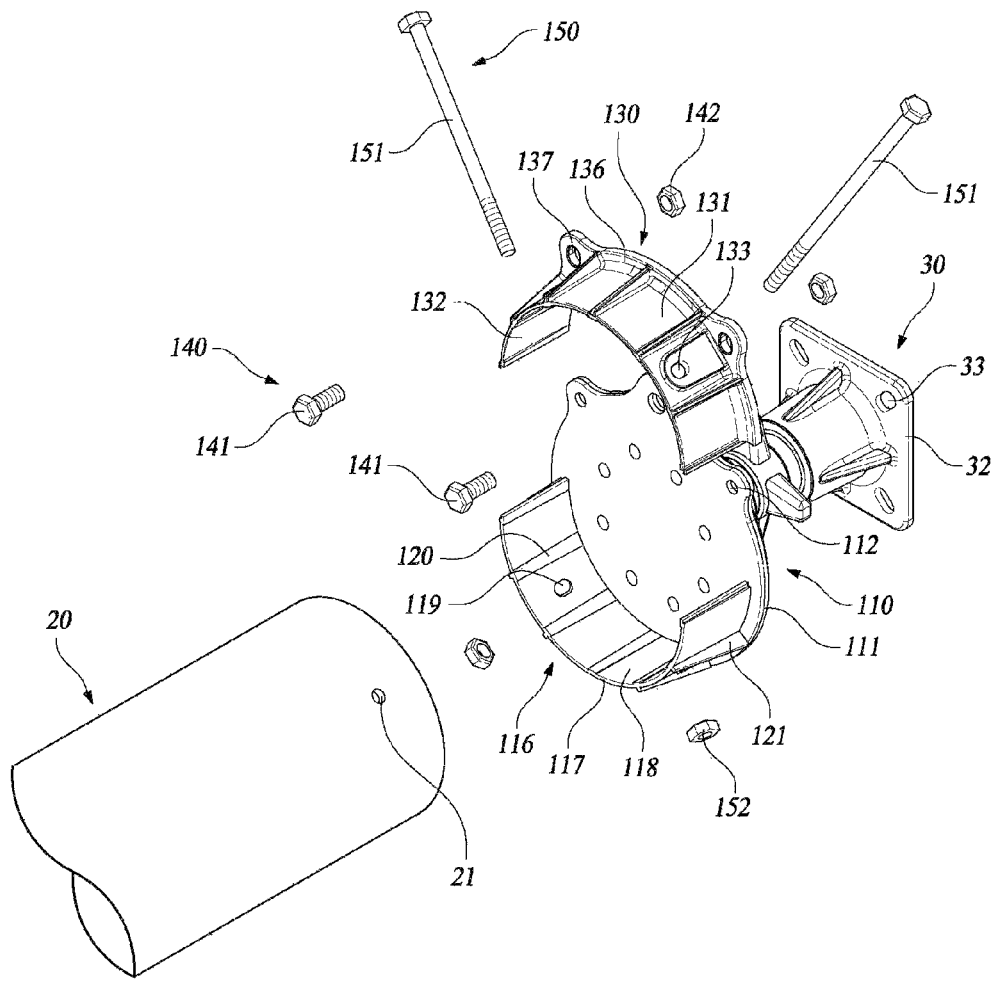
FIG. 2 is an exploded perspective view showing a steel pipe strut connector of the steel pipe strut assembly according to the present invention.
Figure 3:
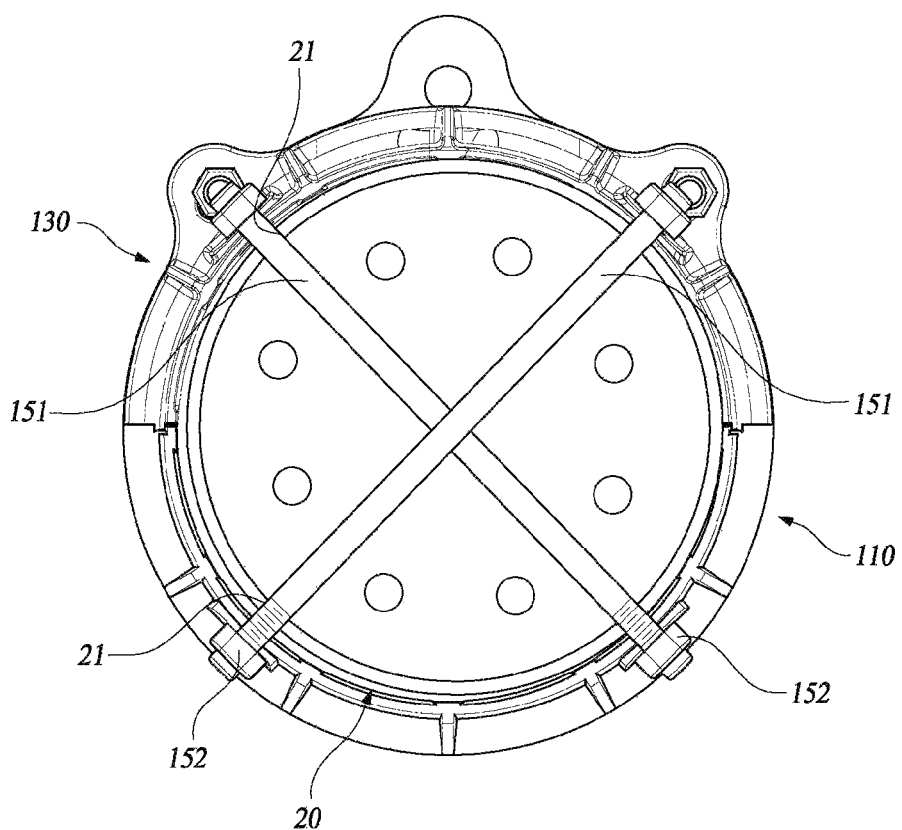
FIG. 3 is a front view showing a connection state between the steel pipe strut connector of FIG. 2 and a steel pipe strut.
Figure 4:
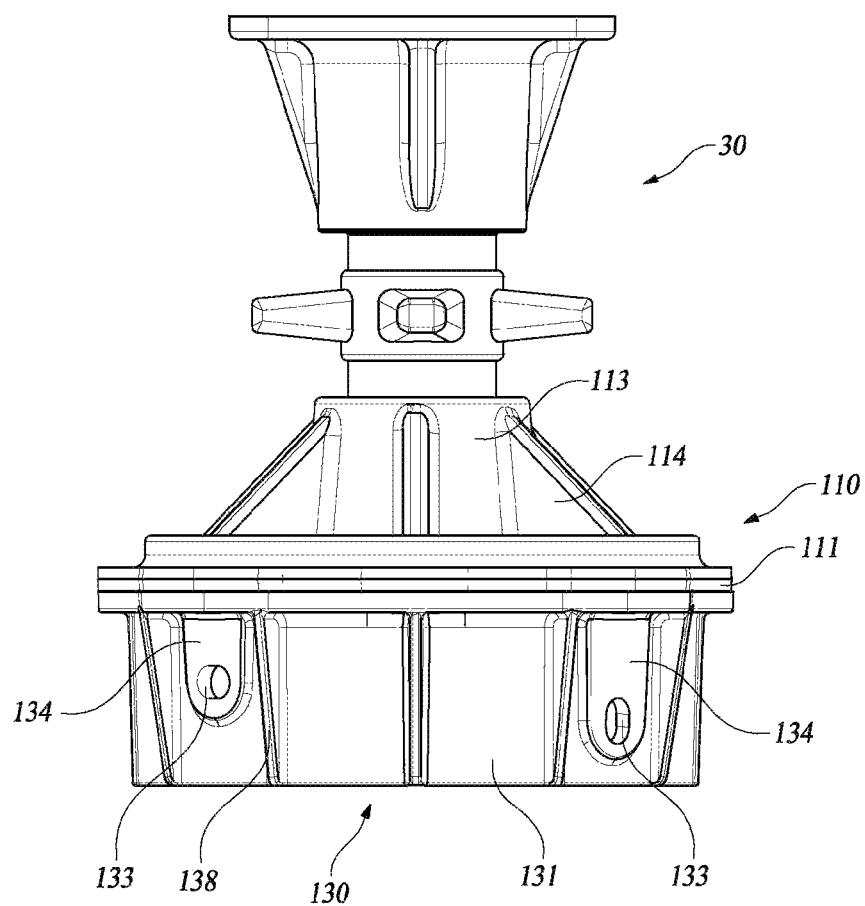
FIG. 4 is a top view showing a connection state between a connector base and a cover band in the steel pipe strut connector of FIG. 2.
Figure 5:
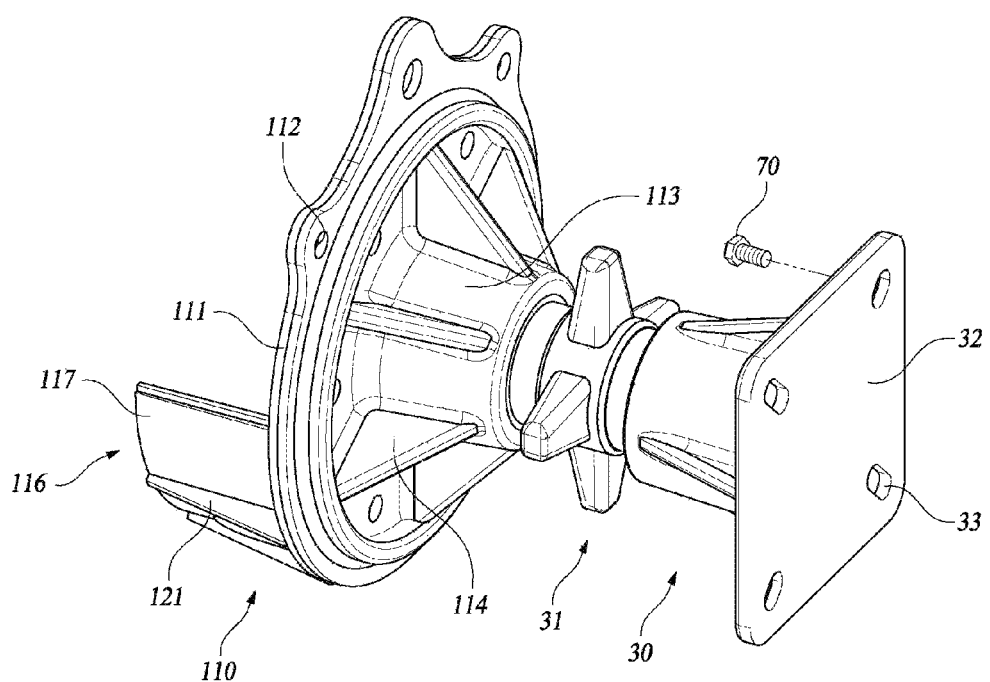
FIGS. 5 and 6 are perspective and top views showing the connector base of the steel pipe strut connector of FIG. 2.
Figure 6:
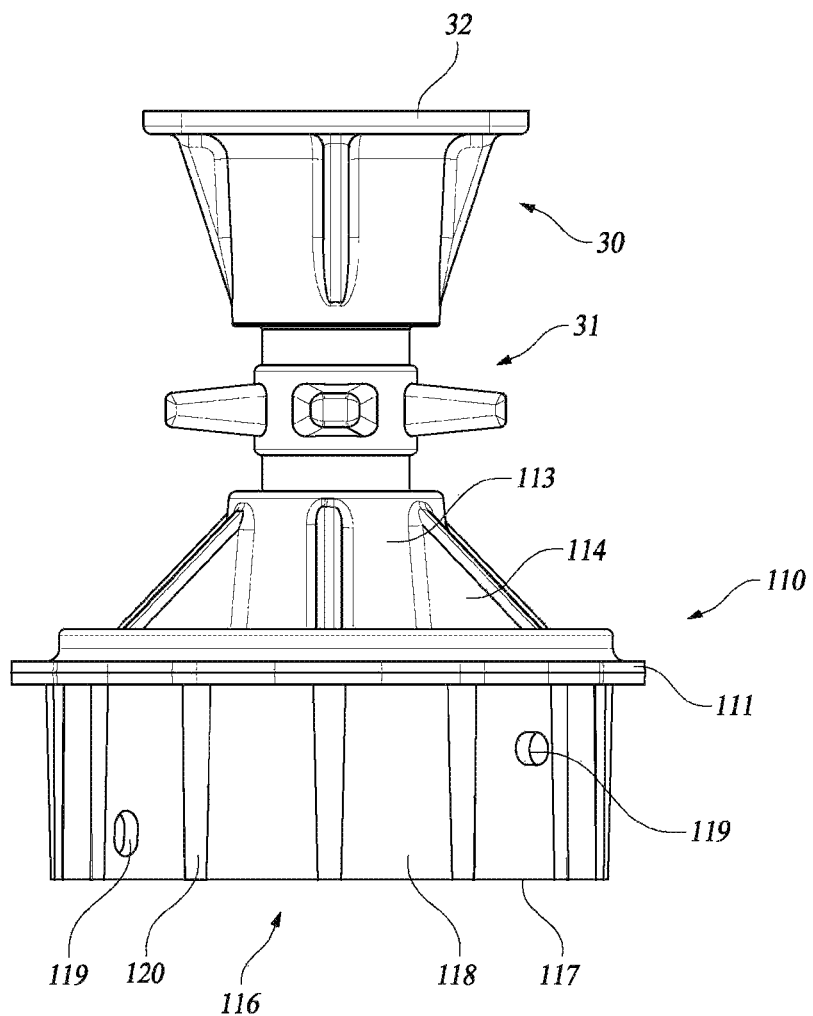
Figure 7:
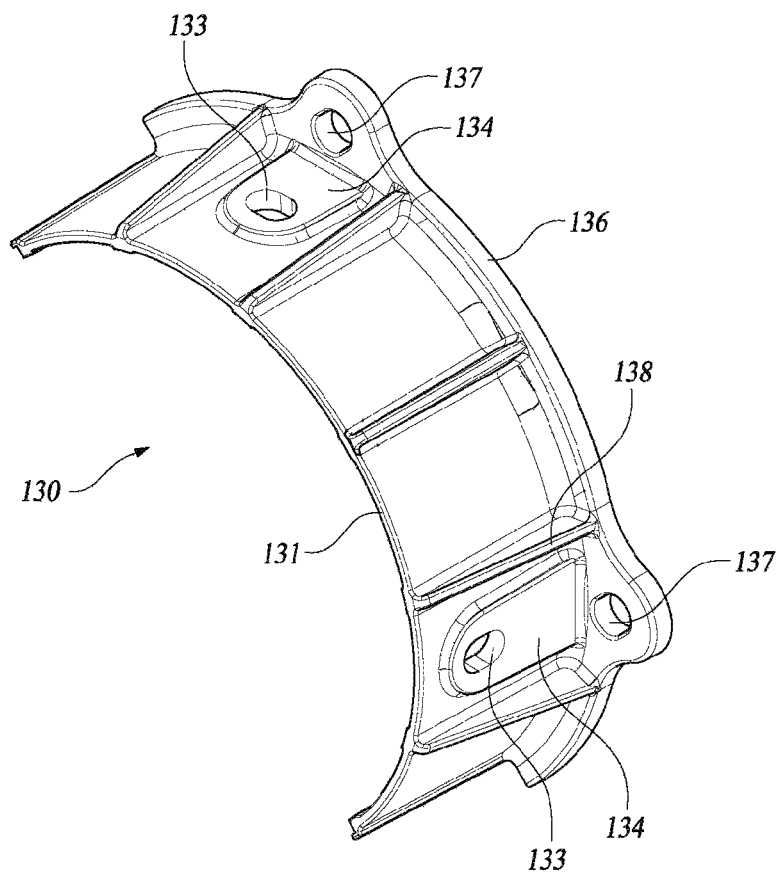
FIGS. 7 and 8 are perspective and front views showing the cover band of the steel pipe strut connector of FIG. 2.
Figure 8:
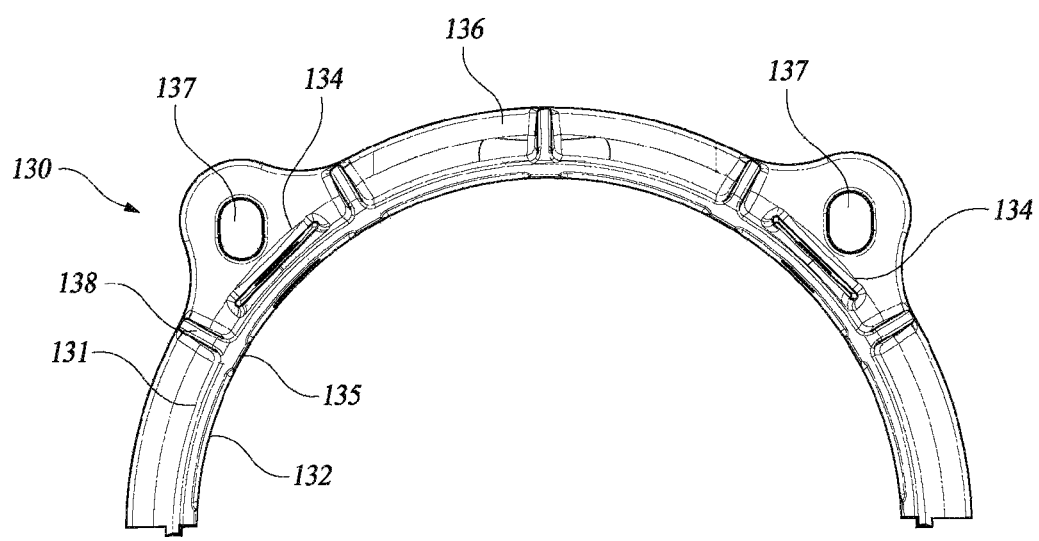

FIG. 1 is a perspective view showing an installation state of a steel pipe strut assembly according to the present invention, FIG. 2 is an exploded perspective view showing a steel pipe strut connector of the steel pipe strut assembly according to the present invention, and FIG. 3 is a front view showing a connection state between the steel pipe strut connector of FIG. 2 and a steel pipe strut.

As shown, a steel pipe strut assembly 50 according to the present invention, which is adapted to connect two wales 10 and 15 coupled to an earth retaining wall to each other, includes one or more steel pipe struts 20 and 25 and a plurality of steel pipe strut connectors 100, 200, and 300 adapted to connect the steel pipe struts 20 and 25. According to the present invention, an example wherein the steel pipe struts 20 and 25 are connected serially to each other will be explained.

For the brevity of the description, hereinafter, the two wales 10 and 15 will be defined as the first wale 10 and the second wale 15, and the two steel pipe struts 20 and 25 as the first steel pipe strut 20 and the second steel pipe strut 25. Also, the three steel pipe strut connectors 100, 200, and 300 will be defined as the first steel pipe strut connector 100, the second steel pipe strut connector 200, and the third steel pipe strut connector 300.

In this case, terms, such as the first, the second, and the third may be used to only distinguish one element from the other element, and the terms do not limit importance, installation locations, numbers, and operating order of the elements.

The first wale 10 and the second wale 15 have the same structure as each other. The first steel pipe strut 20 is relatively closer to the first wale 10 than the second steel pipe strut 25, and the second steel pipe strut 25 is relatively closer to the second wale 15 than the first steel pipe strut 20. The first steel pipe strut 20 and the second steel pipe strut 25 have the same structure as each other. The first steel pipe strut 20 and the second steel pipe strut 25 are arranged serially between the first wale 10 and the second wale 15 facing each other and are then connected to the first wale 10 and the second wale 15 by means of the first to third steel pipe strut connectors 100, 200, and 300, thereby providing a support force to the earth retaining wall to allow the earth retaining wall to be resistant to an earth pressure.

The first steel pipe strut connector 100 is adapted to connect the first wale 10 to the first steel pipe strut 20, the second steel pipe strut connector 200 to connect the second wale 15 to the second steel pipe strut 25, and the third steel pipe strut connector 300 is located between the first steel pipe strut 20 and the second steel pipe strut 25 to connect them to each other.

Referring first to FIGS. 1 to 8, the first steel pipe strut connector 100 is used to connect the first steel pipe strut 20 providing a support force to the first wale 10 of the earth retaining wall located to support an earth wall or rock wall.

The first steel pipe strut connector 100 includes a connector base 110 coupled to an end periphery of the first steel pipe strut 20, a cover band 130 coupled to the connector base 110, and a strut fastener 150 adapted to fasten the connector base 110 and the cover band 130 to the first steel pipe strut 20.

As shown in FIGS. 2 to 6, the connector base 110 includes a base body 111 and a base band 116 protruding from one surface of the base body 111.

The base body 111 has a plurality of base coupling holes 112 formed thereon. The base coupling holes 112 are arranged on the periphery of the base body 111 in such a manner as to be penetrated into the base body 111 in a longitudinal direction of the first steel pipe strut 20 coupled to the connector base 110. Accordingly, cover band fixing members 141 of cover band fixing elements 140 adapted to couple the connector base 110 and the cover band 130 are inserted into the base coupling holes 112.

A base connector 113 protrudes from the other surface of the base body 111 in the opposite direction to the protruding direction of the base band 116. The base connector 113 has a shape of a cylinder and a plurality of base reinforcing ribs 114 arranged along an outer peripheral surface thereof. The base reinforcing ribs 114 are arranged along the outer peripheral surface of the base connector 113 in such a manner as to connect the base connector 113 to the base body 111, thereby obtaining an effect of increment in the whole strength of the connector base 110.

A connection jack 30 is coupled to the base connector 113. When the first steel pipe strut 20 is connected to the first wale 10, it is possible to adjust a distance between the first wale 10 and the first steel pipe strut 20 by means of the connection jack 30. The connection jack 30 pressurizes the first steel pipe strut connector 100 toward the first steel pipe strut 20 to allow the distance between the first wale 10 and the first steel pipe strut 20 to be adjusted.

The connection jack 30 includes a connection jack body 31 coupled to the connector base 110 of the first steel pipe strut connector 100 and a connection jack bracket 32 coupled to the connection jack body 31 in such a manner as to be fixedly located to the first wale 10. The connection jack bracket 32 has a plurality of connection jack coupling holes 33. Further, fixing members 70 are inserted into the connection jack coupling holes 33 to fix the connection jack 30. The connection jack 30 is fixed to the first wale 10 in such a manner as to allow the fixing members 70 to be fixed to a connection device 40 coupled to the first wale 10 through the connection jack coupling holes 33. If the connection device 40 does not exist, the fixing members 70 for fixing the connection jack 30 can be directly coupled to the first wale 10. The connection jack coupling holes 33 have shapes of long holes extended in a direction crossing the pressurizing direction of the first steel pipe strut connector 100.

If the connection jack coupling holes 33 have the shapes of the long holes, like this, it is easy to adjust the coupling location of the connection jack 30 on the connection device 40 or on the first wale 10, and even if the connection jack 30 has a machining error, it is relatively easy to install the connection jack 30 on the connection device 40 or the first wale 10 by means of the adjustment in location of the connection jack 30.

In the figures, the four connection jack coupling holes 33 are arranged symmetrically in every direction, but the number and location of connection jack coupling holes 33 may be freely changed. The base band 116 includes a base band body 117 having a base band arch portion 118. The base band arch portion 118 has a shape of an arch corresponding to the outer peripheral surface of the first steel pipe strut 20 in such a manner as to be formed inside the base band body 117. The base band arch portion 118 partially surrounds the outer peripheral surface of the first steel pipe strut 20 in such a manner as to support the end periphery of the first steel pipe strut 20. The base band arch portion 118 has a plurality of base band through holes 119 formed thereon. The base band through holes 119 are formed correspondingly to strut coupling holes 21 formed on the first steel pipe strut 20.

As shown in FIG. 3, the strut coupling holes 21 of the first steel pipe strut 20 are formed on the end periphery of the first steel pipe strut 20 in a radial direction of the first steel pipe strut 20, that is, in a center axis direction of the first steel pipe strut 20 on the outer peripheral surface of the first steel pipe strut 20. The strut coupling holes 21, which face with each other on the outer peripheral surface of the first steel pipe strut 20, pair up. In detail, two pairs of strut coupling holes 21 are located on straight lines, and fastening members 151 of the strut fastener 150 are inserted into the two pairs of strut coupling holes 21. According to the present invention, an example wherein the two pairs of strut coupling holes 21 are formed on the first steel pipe strut 20 is suggested.

The two base band through holes 119 are formed correspondingly to the two strut coupling holes 21 formed on a relatively lower side among the four strut coupling holes 21 formed on the first steel pipe strut 20 in such a manner as to be spaced apart from each other on the base band body 117. When the end periphery of the first steel pipe strut 20 is coupled to the connector base 110, the base band through holes 119 face the strut coupling holes 21. Accordingly, the fastening members 151 are inserted into the strut coupling holes 21 through the base band through holes 119, and otherwise, the fastening members 151 passing through the first steel pipe strut 20 by means of the strut coupling holes 21 may be inserted into the base band through holes 119.

The base band through holes 119 have shapes of long holes extended in one direction and have sizes larger than the strut coupling holes 21. If the sizes of the base band through holes 119 are larger than those of the strut coupling holes 21, like this, it is easy to allow the strut coupling holes 21 to correspond to the base band through holes 119 when the end periphery of the first steel pipe strut 20 is placed on the base band 116. The strut coupling holes 21 may be finely formed in different locations every the first steel pipe strut 20 due to their machining error, and in the same manner as above, the base band through holes 119 may be finely formed in different locations every the connector base 110. In this case, if the sizes of the base band through holes 119 are larger than those of the strut coupling holes 21, it is possible to allow the strut coupling holes 21 to correspond to the base band through holes 119 through the adjustment in position of the first steel pipe strut 20 even if the first steel pipe strut 20 or the connector base 110 have machining errors.

The extended directions of the two base band through holes 119 formed on the base band body 117 are different from each other. In detail, one of the two base band through holes 119 is extended in the longitudinal direction of the first steel pipe strut 20 coupled to the base band 116, and the other is extended in a vertical direction with respect to the longitudinal direction of the first steel pipe strut 20. If the first steel pipe strut 20 or the connector base 110 have machining errors, such arrangement of the base band through holes 119 is more advantageous in allowing the strut coupling holes 21 to correspond to the base band through holes 119 through the adjustment in position of the first steel pipe strut 20. As a result, also, the arrangement of the base band through holes 119 enables the fastening members 151 to be easily fastened to the base band 116 and the first steel pipe strut 20.

A plurality of base band pressurizing protrusions 120 is formed on the base band arch portion 118 of the base band 116. The base band pressurizing protrusions 120 protrude from the base band arch portion 118 in such a manner as to be spaced apart from each other by a given distance in a circumferential direction of the base band arch portion 118. The base band pressurizing protrusions 120 come into close contact with the outer peripheral surface of the first steel pipe strut 20 when the first steel pipe strut 20 is placed on the base band arch portion 118, thereby increasing a coupling force between the base band 116 and the first steel pipe strut 20. Detailed structure, number, and arrangement distance of the base band pressurizing protrusions 120 may be freely changed.

The base band body 117 has a plurality of base band reinforcing ribs 121 spaced apart from each other along the outer peripheral surface thereof. The base band reinforcing ribs 121 protrude from the base band body 117 in such a manner as to be connected to the base body 111, thereby increasing the whole strength of the base band 116 and the connector base 110. Through the base band reinforcing ribs 121, a thickness of the base band 116 can be reduced, while the strength is being maintained, so that advantages like the reduction of material costs and weight can be provided. The number or shape of base band reinforcing ribs 121 can be freely changed, without being limited thereto.

As shown in FIGS. 2 to 4 and 7, the cover band 130 is separably coupled to the connector base 110 in such a manner as to surround a portion of the outer peripheral surface of the first steel pipe strut 20 coupled to the connector base 110. The cover band 130 has a cover band body 131 having a cover band arch portion 132 corresponding to the outer peripheral surface of the first steel pipe strut 20.

The cover band arch portion 132 has a shape of an arch corresponding to the outer peripheral surface of the first steel pipe strut 20 in such a manner as to be formed inside the cover band body 131. The cover band arch portion 132 partially surrounds the outer peripheral surface of the first steel pipe strut 20 in such a manner as to cover the end periphery of the first steel pipe strut 20. The cover band arch portion 132 has a plurality of cover band through holes 133 formed thereon. The cover band through holes 133 are formed correspondingly to the strut coupling holes 21 formed on the first steel pipe strut 20. Further, the cover band body 131 has a plurality of cover band thickness reinforcing portions 134 protruding from the outer peripheral surface thereof, and the cover band through holes 133 are arranged on the cover band thickness reinforcing portions 134.

The two cover band through holes 133 are formed correspondingly to the two strut coupling holes 21 formed on a relatively upper side among the four strut coupling holes 21 formed on the first steel pipe strut 20 in such a manner as to be spaced apart from each other on the cover band body 131. When the end periphery of the first steel pipe strut 20 is coupled to the cover band 130, the cover band through holes 133 face the strut coupling holes 21. Accordingly, the fastening members 151 are inserted into the strut coupling holes 21 through the cover band through holes 133, and otherwise, the fastening members 151 passing through the first steel pipe strut 20 by means of the strut coupling holes 21 may be inserted into the cover band through holes 133.

The cover band through holes 133 have shapes of long holes extended in one direction, like the base band through holes 119 of the base band 116, and have sizes larger than the strut coupling holes 21. If the sizes of the cover band through holes 133 are larger than those of the strut coupling holes 21, like this, it is possible to allow the cover band through holes 133 to correspond to the strut coupling holes 21 through the adjustment in position of the cover band 130 even if the first steel pipe strut 20 or the cover band 130 have machining errors.

The extended directions of the two cover band through holes 133 formed on the cover band 130 are different from each other. Like the base band through holes 119 of the base band 116, in detail, one of the two cover band through holes 133 is extended in the longitudinal direction of the first steel pipe strut 20 coupled to the cover band 130, and the other is extended in a vertical direction with respect to the longitudinal direction of the first steel pipe strut 20. When the cover band 130 is coupled to the connector base 110, the extended directions of the base band through holes 119 and the cover band through holes 133 facing each other are the same as each other. When the cover band 130 is coupled to the connector base 110, in detail, the base band through hole 119 and the cover band through hole 133, which are extended in the longitudinal direction of the first steel pipe strut 20, face each other, and the base band through hole 119 and the cover band through hole 133, which are extended in the vertical direction with respect to the longitudinal direction of the first steel pipe strut 20, face each other. Such arrangement of the cover band through holes 133 is more advantageous in allowing the cover band through holes 133 to correspond to the strut coupling holes 21 through the adjustment in position of the cover band 130. Accordingly, the arrangement of the cover band through holes 133 enables the fastening members 151 to be easily fastened to the cover band 130 and the first steel pipe strut 20.

A plurality of cover band pressurizing protrusions 135 is formed on the cover band arch portion 132 of the cover band 130. The cover band pressurizing protrusions 135 protrude from the cover band arch portion 132 in such a manner as to be spaced apart from each other by a given distance in a circumferential direction of the cover band arch portion 132. The cover band pressurizing protrusions 135 come into close contact with the outer peripheral surface of the first steel pipe strut 20 to allow the first steel pipe strut 20 to be more stably fixed to the connector base 110 when the cover band 130 is coupled to the connector base 110, thereby increasing a coupling force between the cover band 130 and the first steel pipe strut 20. Detailed structure, number, and arrangement distance of the cover band pressurizing protrusions 135 may be freely changed.

Further, the cover band body 131 has a cover band flange 136 protruding from the outer periphery thereof. The cover band flange 136 has a plurality of cover band coupling holes 137 formed thereon. The cover band coupling holes 137 are formed correspondingly to the base coupling holes 112 of the connector base 110. Accordingly, the cover band fixing members 141 of the cover band fixing elements 140 are inserted into the cover band coupling holes 137.

The cover band coupling holes 137 have shapes of long holes extended in one direction and have sizes larger than the base coupling holes 112. If the sizes of the cover band coupling holes 137 are larger than those of the base coupling holes 112, like this, it is easy to allow the cover band coupling holes 137 to correspond to the base coupling holes 112 through the adjustment in position of the cover band 130 when the cover band 130 is coupled to the connector base 110. After the first steel pipe strut 20 is placed on the base band 116, the cover band 130 covers a top periphery of the first steel pipe strut 20 in such a manner as to be coupled to the connector base 110, and accordingly, it is desirable that the cover band coupling holes 137 are extended in a direction where the cover band 130 covers the first steel pipe strut 20.

The cover band body 131 has a plurality of cover band reinforcing ribs 138 spaced apart from each other along the outer peripheral surface thereof. The cover band reinforcing ribs 138 protrude from the cover band body 131 in such a manner as to be connected to the cover band flange 136, thereby increasing the whole strength of the cover band body 131 and the cover band 130. Through the cover band reinforcing ribs 138, a thickness of the cover band 130 can be reduced, while the strength is being maintained, so that advantages like the reduction of material costs and weight can be provided. The number or shape of cover band reinforcing ribs 138 can be freely changed, without being limited thereto.

The cover band 130 is fixed to the connector base 110 by means of the cover band fixing elements 140 in such a manner as to cover the end periphery of the first steel pipe strut 20. Each cover band fixture 140 includes the cover band fixing member 141 and a cover band fixing nut 142 screw-coupled to the cover band fixing member 141. In a state where the cover band 130 covers the first steel pipe strut 20 coupled to the connector base 110, the cover band fixing members 141 are inserted into the base coupling holes 112 of the connector base 110 and the cover band coupling holes 137 of the cover band 130, and after that, the cover band fixing nuts 142 are screw-coupled to the cover band fixing members 141, thereby allowing the cover band 130 to be firmly fixed to the connector base 110.

A coupling structure between the connector base 110 and the cover band 130 may be freely changed. For example, the connector base 110 may be configured to have the base coupling holes 112 formed on the base band 116, so that the cover band coupling holes 137 of the cover band 130 may be changed in position. According to a coupling method between the connector base 110 and the cover band 130, further, the base coupling holes 112 of the connector base 110 or the cover band coupling holes 137 of the cover band 130 may not exist. Furthermore, the cover band fixing elements 140 having the cover band fixing members 141 and the cover band fixing nuts 142 may be changed into those having different members.

The first steel pipe strut connector 100 is coupled to the end periphery of the first steel pipe strut 20 to allow the first steel pipe strut 20 to be connected to the first wale 10. When the first steel pipe strut connector 100 is coupled to the first steel pipe strut 20, the end periphery of the first steel pipe strut 20 is first placed on the base band arch portion 118 of the connector base 110. In this case, the base band arch portion 118 surrounds about half of the outer peripheral surface of the first steel pipe strut 20, and the cover band 130 is coupled to the first steel pipe strut 20 in such a manner as to surround the remaining half of the outer peripheral surface of the first steel pipe strut 20. After the cover band 130 surrounds the first steel pipe strut 20, the cover band 130 is firmly fixed to the connector base 110 by means of the cover band fixing elements 140. In a state where the fastening members 151 of the strut fastener 150 are inserted into the base band through holes 119 of the base band 116, the cover band through holes 133 of the cover band 130, and the strut coupling holes 21 of the first steel pipe strut 20, next, the fastening nuts 152 are screw-coupled to the fastening members 151, thereby allowing the first steel pipe strut 20, the connector base 110, and the cover band 130 to be firmly fastened to one another. One pair of fastening members 151 is coupled to the connector base 110, the cover band 130, and the first steel pipe strut 20 in such a manner as to cross each other vertically, thereby allowing the first steel pipe strut 20, the connector base 110, and the cover band 130 to be more firmly fastened to one another.

Like this, the first steel pipe strut connector 100 coupled to the end periphery of the first steel pipe strut 20 can stably connect the first steel pipe strut 20 to the first wale 10 to which the connection device 40 is coupled.

Figure 9:
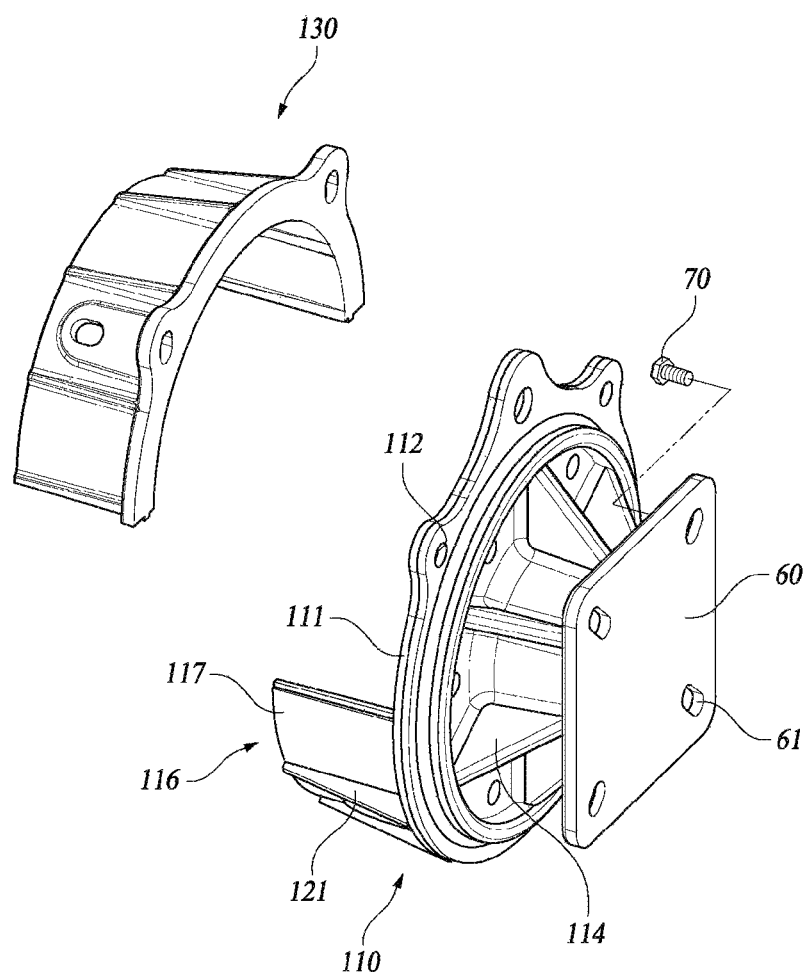
FIG. 9 is a perspective view showing another steel pipe strut connector of the steel pipe strut assembly according to the present invention.
Figure 10:
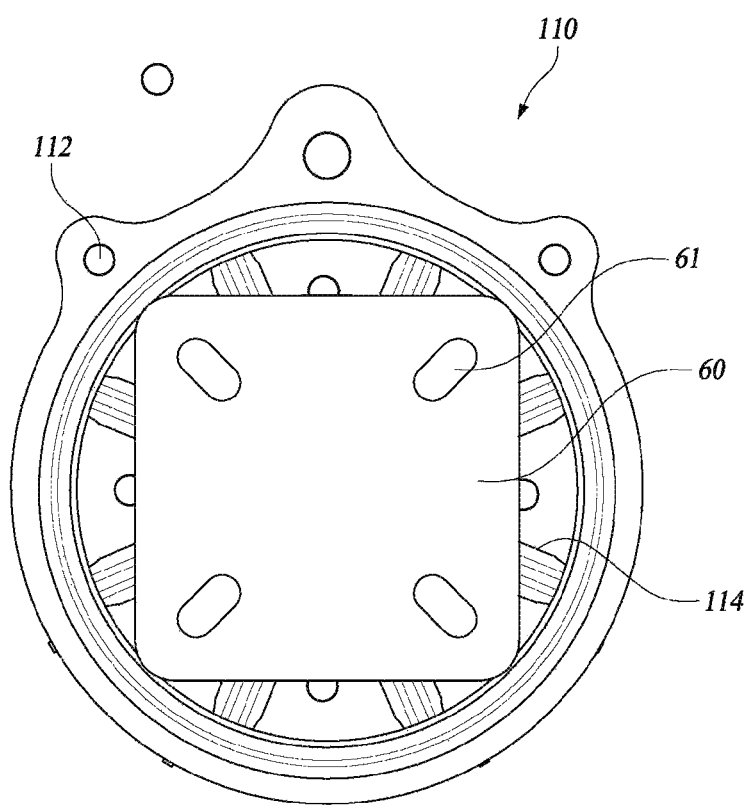
FIG. 10 is a rear view showing a connector base of the steel pipe strut connector of FIG. 9.

FIG. 9 is a perspective view showing another steel pipe strut connector of the steel pipe strut assembly according to the present invention, and FIG. 10 is a rear view showing a connector base of the steel pipe strut connector of FIG. 9.

As shown in FIGS. 1, 9 and 10, the second steel pipe strut connector 200 includes a connector base 110 coupled to an end periphery of the second steel pipe strut 25, a cover band 130 coupled to the connector base 110, and a strut fastener 150 adapted to fasten the connector base 110 and the cover band 130 to the second steel pipe strut 25. The cover band 130 and the strut fastener 150 are completely the same as in the first steel pipe strut connector 100.

The connector base 110 includes a base body 111, a base band 116 protruding from one surface of the base body 111, a base connector 113 protruding from the other surface the base body 111 in the opposite direction to the protruding direction of the base band 116, and a plurality of base reinforcing ribs 114 arranged along the outer peripheral surface of the base connector 113. The connector base 110 is almost the same as in the first steel pipe strut connector 100.

Further, a fixing bracket 60 is fixed to the base connector 113. The fixing bracket 60 has a plurality of fixing bracket coupling holes 61 formed thereon. Fixing members 70 are inserted into the fixing bracket coupling holes 61 to fix the fixing bracket 60. As the fixing members 70 are fixed to a connection device 40 coupled to the second wale 15 through the fixing bracket coupling holes 61 of the fixing bracket 60, accordingly, the connector base 110 is fixedly located to the second wale 15. If the connection device 40 does not exist, the fixing members 70 for fixing the fixing bracket 60 may be directly coupled to the second wale 15. The fixing bracket coupling holes 61 have shapes of long holes extended in a direction crossing a longitudinal direction of the second steel pipe strut 25.

If the fixing bracket coupling holes 61 have the shapes of the long holes, like this, it is easy to adjust a coupling location of the connector base 110 on the connection device 40 or on the second wale 15, and even if the connector base 110 has a machining error, it is relatively easy to install the connector base 110 on the connection device 40 or the second wale 15 through the adjustment in position of the connector base 110.

As shown in FIG. 10, the fixing bracket coupling holes 61 are not laid on the base reinforcing ribs 114 of the connector base 110. When the fixing members 70 are inserted into the fixing bracket coupling holes 61, in detail, the base reinforcing ribs 114 are placed on locations where no interruption with the fixing members 70 occurs.

In the figures, the four fixing bracket coupling holes 61 are arranged symmetrically in every direction, but the number and location of fixing bracket coupling holes 61 may be freely changed.

Like this, the second steel pipe strut connector 200 can be simply and firmly coupled to the end periphery of the second steel pipe strut 25 and thus fix the second steel pipe strut 25 to the second wale 15.

Figure 11:
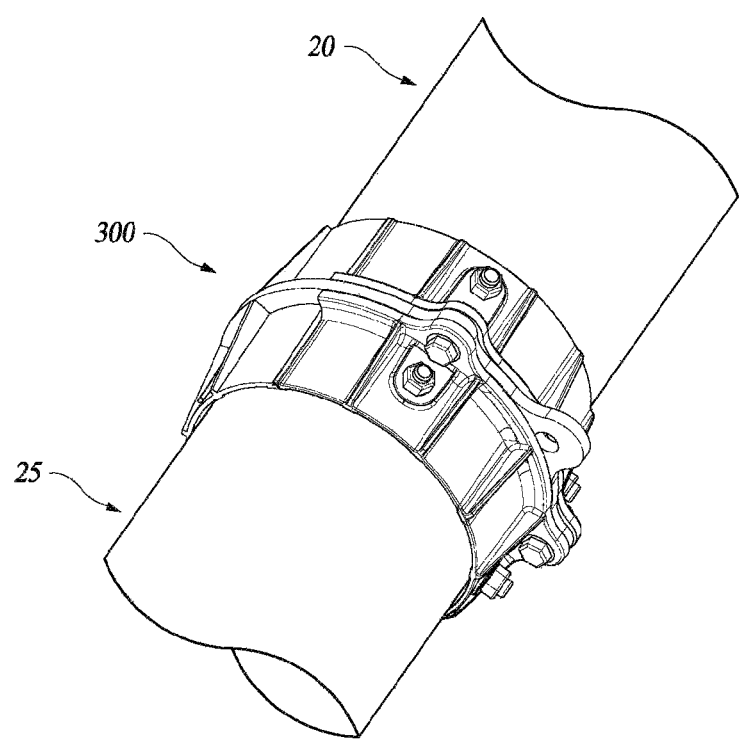
FIG. 11 is a perspective view showing a connection state between yet another steel pipe strut connector and steel pipe struts of the steel pipe strut assembly according to the present invention.
Figure 12:
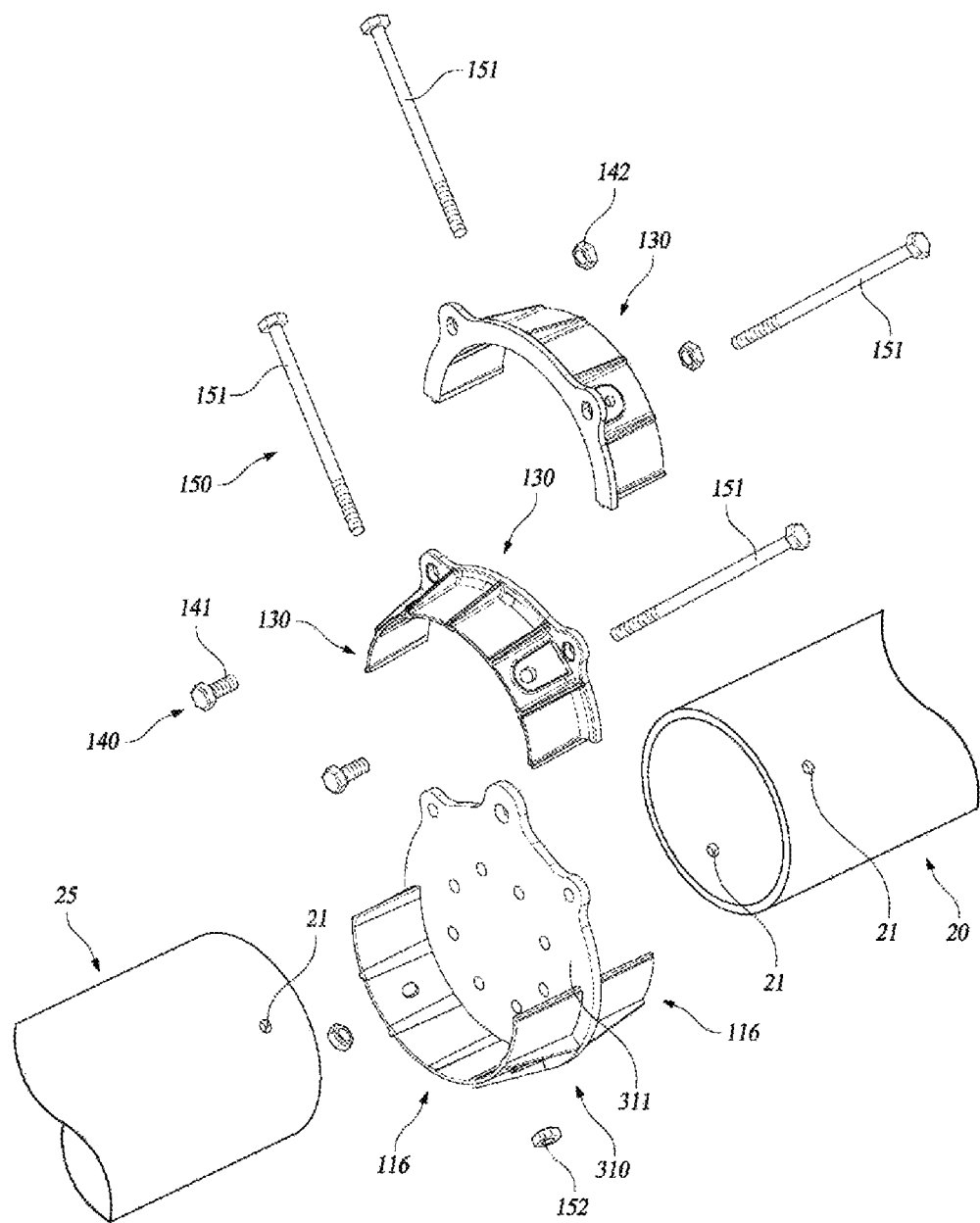
FIG. 12 is an exploded perspective view showing the steel pipe strut connector of FIG. 11.

FIG. 11 is a perspective view showing a connection state between yet another steel pipe strut connector and steel pipe struts of the steel pipe strut assembly according to the present invention, and FIG. 12 is an exploded perspective view showing the steel pipe strut connector of FIG. 11.

As shown in FIGS. 11 and 12, the third steel pipe strut connector 300 is used to connect the first and second steel pipe struts 20 and 25 to each other and includes a connector base 310 coupled to end peripheries of the first and second steel pipe struts 20 and 25, a pair of cover bands 130 coupled to the connector base 310, and a strut fastener 150 adapted to fasten the connector base 310 and one pair of cover bands 130 to the first and second steel pipe struts 20 and 25. The connector base 310 is configured to have one pair of base bands 116 located on both side peripheral surfaces of a base body 311, while placing the base body 311 therebetween. The base band 116, the cover band 130 and the strut fastener 150 are the same as mentioned above.

Like this, the third steel pipe strut connector 300 is configured to have the connector base 310 having the two base bands 116 supporting the end peripheries of the first and second steel pipe struts 20 and 25 and the two cover bands 130 corresponding to the two base bands 116, thereby allowing the respective end peripheries of the first and second steel pipe struts 20 and 25 to be facingly connected with each other.

Like this, the third steel pipe strut connector 300 is simply and firmly coupled to the first and second steel pipe struts 20 and 25 to maintain the stably connected states of the first and second steel pipe struts 20 and 25.

As mentioned above, the first to third steel pipe strut connectors 100, 200 and 300 of the steel pipe strut assembly 50 according to the present invention are firmly coupled to the end peripheries of the first and second steel pipe struts 20 and 25 to allow the first and second steel pipe struts 20 and 25 to be stably connected to the first and second wales 10 and 15 or to each other.

Further, the steel pipe strut assembly 50 according to the present invention can adjust the distance between the first wale 10 and the first steel pipe strut connector 100 by means of the connection jack 30 located between the first wale 10 and the first steel pipe strut connector 100, thereby stably connecting and supporting the first and second wales 10 and 15.

Furthermore, the first to third steel pipe strut connectors 100, 200 and 300 according to the present invention can be easily coupled to the first and second steel pipe struts 20 and 25 and can be conveniently handled by the worker, thereby reducing the time required for the connection of the first and second steel pipe struts 20 and 25.

While the present invention has been described with reference to the desirable examples, it is not to be restricted by the examples and the figures.

For example, the connector base 110 may have free structures wherein the base band arch portion 118 and the base band through holes 119 are formed, and the cover band 130 may have free structures wherein the cover band arch portion 132 and the cover band through holes 133 are formed.

In the figures, also, the strut fastener 150 is provided with the two fastening members 151, but the number of fastening members 151 may be freely changed according to the number of strut coupling holes 21 formed on the first steel pipe strut 20.

Even if not shown in the figures, also, pads made of an elastic material like rubber may be located between the first steel pipe strut 20 and the base band 116 and between the first steel pipe strut 20 and the cover band 130. The pad, which is located between the first steel pipe strut 20 and the base band 116, serves to seal a gap between the first steel pipe strut 20 and the base band 116 and to prevent the first steel pipe strut 20 and the base band 116 from being pushed against each other, thereby increasing a coupling force therebetween. Also, the pad, which is located between the first steel pipe strut 20 and the cover band 130, serves to seal a gap between the first steel pipe strut 20 and the cover band 130 and to prevent the first steel pipe strut 20 and the cover band 130 from being pushed against each other, thereby increasing a coupling force therebetween.

Further, the steel pipe strut assembly 50 according to the present invention may be configured to have one steel pipe strut located between two wales or to have three or more steel pipe struts located between two wales in such a manner as to be connected serially to one another by means of the steel pipe strut connectors.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A steel pipe strut connector configured to be coupled to an end of a periphery of a steel pipe strut connected to an earth retaining wall, the steel pipe strut connector comprising:
   a connector base having a base body and a base band, the base band including a base band body located on the base body and having a base band arch portion corresponding to an outer peripheral surface of the steel pipe strut and a plurality of base band through holes formed on the base band body in such a manner as to correspond to a plurality of strut coupling holes spaced apart from each other on the outer peripheral surface of the steel pipe strut in a radial direction of the steel pipe strut;
   a cover band having a cover band body including a cover band arch portion corresponding to the outer peripheral surface of the steel pipe strut and a plurality of cover band through holes formed on the cover band body in such a manner as to correspond to the plurality of strut coupling holes;
   one or more cover band fixing elements adapted to fix the cover band to the connector base; and
   a plurality of fastening members configured to be inserted into the plurality of strut coupling holes, the plurality of base band through holes, and the plurality of cover band through holes to fasten the steel pipe strut to the connector base and the cover band,
   wherein each of the plurality of cover band through holes has a shape longitudinally extending in one direction and an extending direction of at least one of the plurality of cover band through holes is different from an extending direction of another one of the plurality of cover band through holes,
   wherein each of the plurality of base band through holes has a shape longitudinally extending in one direction and an extending direction of at least one of the plurality of base band through holes is different from an extending direction of another one of the plurality of base band through holes,
   wherein one of the plurality of base band through holes and one of the plurality of cover band through holes facing each other are formed to longitudinally extend in a same direction,
   wherein a plurality of base band pressurizing protrusions are formed on the base band arch portion in such a manner as to be spaced apart from each other by a given distance in a circumferential direction of the base band arch portion so as to be in contact with the outer peripheral surface of the steel pipe strut, and
   wherein a plurality of cover band pressurizing protrusions are formed on the cover band arch portion in such a manner as to be spaced apart from each other by a given distance in a circumferential direction of the cover band arch portion so as to be in contact with the outer peripheral surface of the steel pipe strut.

2. The steel pipe strut connector according to claim 1, wherein at least one of the plurality of fastening members is located to vertically cross another fastening member to allow the steel pipe strut, the connector base, and the cover band to be fastened to one another.

3. The steel pipe strut connector according to claim 1, wherein one pair of base bands are located to place the base body therebetween to allow two steel pipe struts to be coupled to the connector base and one pair of cover bands are coupled to the connector base in such a manner as to correspond to the one pair of base bands.

4. A steel pipe strut assembly for connecting two wales coupled to earth retaining walls, the steel pipe strut assembly comprising:
   a steel pipe strut;
   a first steel pipe strut connector located between the steel pipe strut and one of the two wales;
   a second steel pipe strut connector located between the steel pipe strut and the other of the two wales; and
   a connection jack located between one of the two wales and the first steel pipe strut connector to pressurize the first steel pipe strut connector so that a distance between one of the two wales and the first steel pipe strut connector is adjusted,
   wherein the distance between one of the two wales and the first steel pipe strut connector is changeable by means of the connection jack, and the second steel pipe strut connector is fixedly connected to the other of the two wales,
   wherein the first steel pipe strut connector and the second steel pipe strut connector respectively comprises:
   a connector base having a base body and a base band, the base band including a base band body located on the base body and having a base band arch portion corresponding to an outer peripheral surface of the steel pipe strut and a plurality of base band through holes formed on the base band body in such a manner as to correspond to a plurality of strut coupling holes spaced apart from each other on the outer peripheral surface of the steel pipe strut in a radial direction of the steel pipe strut;
   a cover band having a cover band body including a cover band arch portion corresponding to the outer peripheral surface of the steel pipe strut and a plurality of cover band through holes formed on the cover band body in such a manner as to correspond to the plurality of strut coupling holes;
   one or more cover band fixing elements adapted to fix the cover band to the connector base; and
   a plurality of fastening members configured to be inserted into the plurality of strut coupling holes, the plurality of base band through holes, and the plurality of cover band through holes to fasten the steel pipe strut to the connector base and the cover band, wherein each of the plurality of cover band through holes has a shape longitudinally extending in one direction and an extending direction of at least one of the plurality of cover band through holes is different from an extending direction of another one of the plurality of cover band through holes, wherein each of the plurality of base band through holes has a shape longitudinally extending in one direction and an extending direction of at least one of the plurality of base band through holes is different from an extending direction of another one of the plurality of base band through holes, wherein one of the plurality of base band through holes and one of the plurality of cover band through holes facing each other are formed to longitudinally extend in a same direction, wherein a plurality of base band pressurizing protrusions are formed on the base band arch portion in such a manner as to be spaced apart from each other by a given distance in a circumferential direction of the base band arch portion so as to be in contact with the outer peripheral surface of the steel pipe strut, and wherein a plurality of cover band pressurizing protrusions are formed on the cover band arch portion in such a manner as to be spaced apart from each other by a given distance in a circumferential direction of the cover band arch portion so as to be in contact with the outer peripheral surface of the steel pipe strut.

5. The steel pipe strut assembly according to claim 4, wherein the connection jack comprises:
- a connection jack body coupled to the connector base of the first steel pipe strut connector; and
- a connection jack bracket coupled to the connection jack body in such a manner as to be fixedly located to one of the two wales and having a plurality of connection jack coupling holes adapted to insert fixing members for coupling one of the two wales thereinto, each of the plurality of connection jack coupling holes having a shape longitudinally extending in a direction crossing a pressurizing direction of the first steel pipe strut connector.

6. The steel pipe strut assembly according to claim 4, wherein a plurality of steel pipe struts are arranged serially with one another by means of a third steel pipe strut connector and the third steel pipe strut connector comprises a pair of base bands located on both sides of the connector base to allow two steel pipe struts adjacent to each other to be connected to each other and a pair of cover bands corresponding to the pair of base bands, the pair of base bands and the pair of cover bands of the third steel pipe strut connector having a structure identical to that of a pair of base bands and a pair of cover bands of the first steel pipe strut connector or the second steel pipe strut connector.

* * * * *